(12) United States Patent
Esposito, Jr.

(10) Patent No.: US 6,957,153 B2
(45) Date of Patent: Oct. 18, 2005

(54) METHOD OF CONTROLLING PRODUCTION OF A GASEOUS PRODUCT

(75) Inventor: William R. Esposito, Jr., Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 71 days.

(21) Appl. No.: 10/742,900

(22) Filed: Dec. 23, 2003

(65) Prior Publication Data

US 2005/0137810 A1    Jun. 23, 2005

(51) Int. Cl.$^7$ .......................... G06F 19/00; G01L 11/00
(52) U.S. Cl. ........................ 702/32; 702/138; 706/900; 706/52
(58) Field of Search .................... 702/32, 138, 140, 702/179, 181; 706/8, 900, 52; 700/50, 46

(56) References Cited

U.S. PATENT DOCUMENTS

| | | | |
|---|---|---|---|
| 4,200,911 A | 4/1980 | Matsumoto | ................ 364/105 |
| 6,519,582 B1 | 2/2003 | Duflot et al. | ................ 706/52 |
| 2002/0017113 A1 | 2/2002 | Seiver et al. | ................ 62/656 |
| 2003/0028267 A1 * | 2/2003 | Hales et al. | ................ 700/46 |
| 2003/0144766 A1 | 7/2003 | Megan et al. | ................ 700/301 |

OTHER PUBLICATIONS

Petrovic et al., "Fuzzy Control Of A Water Supply System", Automatika, vol. 39, No. 3-4 (1998).
Coulbeck et al., "Pressure Control Of A Moscow Water Supply System Using Export System Technology", Trans. Inst. Measurement & Control, vol. 18, No. 4 (1996) pp 193-201.

* cited by examiner

*Primary Examiner*—John Barlow
*Assistant Examiner*—Meagan S Walling
(74) *Attorney, Agent, or Firm*—David M. Rosenblum

(57) ABSTRACT

A method of controlling production of a gaseous product produced by one or more production plants such as an air separation plant, having a control system to vary production of the gaseous product. The gaseous product is consumed by a customer in accordance with a varying demand pattern. A storage capacity for the gaseous product which may be the pipeline itself or a gaseous receiver tank is provided. Control is exercised by a fuzzy logic program that utilizes the average rate of change of customer demand and storage capacity pressure to produce control data to vary the production rate of the plant.

10 Claims, 4 Drawing Sheets

METHOD OF CONTROLLING PRODUCTION OF A GASEOUS PRODUCT

FIELD OF THE INVENTION

The present invention relates to a method for controlling the production of gaseous product produced by one or more production plants for supply to customers having varying consumption rates. More particularly, the present invention relates to such a method in which the control is exercised by a fuzzy logic controller that is programmed to maintain pressure within the pipeline or other gaseous storage capacity within a predetermined range.

BACKGROUND OF THE INVENTION

Production plants, such as air separation plants, supply gaseous products to customers by means of pipeline systems. Typically, demand patterns for each customer tend not to be constant so that the total demand of all customers for the gaseous product will range above and below production capability of the production plant or plants supplying the gaseous product.

In order to meet customer demand for the gaseous product under circumstances in which the total demand is above production capability, the pipeline system used to supply the customers is operated with, what is known in the art, as "pressure pack". In pressure pack, pipeline pressure or other storage capacity pressure is increased during periods of low demand and additional gas is supplied to the customers by reducing the pressure during periods of high demand. Additionally, during high demand periods, stored liquid may be vaporized to meet the demand.

The volume within the pipeline system necessary to store sufficient quantities of gas is either provided by the pipeline itself or through the use of gas receivers which are nothing more than high pressure storage tanks. Economic inefficiencies creep into such supply schemes through gas venting and excessive vaporization of liquid. For instance, when the pressure within available gaseous storage is too high, the gaseous product is vented to maintain safety limits. On the other hand, when pressure is too low, the additional gaseous product supplied by vaporization of stored liquid is expensive in that the liquid, as compared to the gas, is a value added product due to the expense involved in liquefying the gas.

It is therefore important to control the production of the air separation plants in the pipeline system to minimize the vaporization of liquid product and the venting of gaseous product. One solution to minimize the venting of gaseous product or the vaporization of the liquid product is to set the total production equal to the average customer demand over a given time period. Another possible solution is to match the production with customer demand as closely as possible. The forgoing solutions are not, however, practical or even possible to implement. A major reason for such impracticability is that instantaneous customer demand used in forming an average or matching production is often not readily available. Additionally, the customer usage pattern can be unpredictable and the demand itself can change so rapidly that air separation plants and other production plants are not able to change production in a sufficiently short period to match the customer demand. Even in a supply situation in which the customer demand changed at a rate that was sufficiently slow that plant production levels could match the change in customer demand, the resulting plant upsets would lead to seriously reduced product yields.

As a result, plant production levels are manually set by a plant operator who bases plant production on storage pressures, changes in such pressures, perceived customer demand patterns, and experience as to the characteristics of plant response upon control inputs and the rapidity at which pressure within the pipeline or gaseous storage reacts to changes on both the supply and demand side.

As may therefore may be appreciated, the control of one or more air separation plants or other production plants supplying a pipeline lends itself to an automated supervisory control system to set production targets. For instance, U.S. patent application Ser. No. 20030144766 utilizes model predictive control for controlling the target levels of air separation plants that supply a gaseous product to a pipeline. The target levels for the air separation plants are optimized to maintain pipeline pressure within a predetermined range. The optimization is based upon predicting an open loop responsive pressure and to formulate production request changes that are required to at least in part to restore the pressure to the target value from the open loop response. Such a control method is very useful for the control of large pipeline distribution networks. The implementation of such a control method in smaller networks may not always be cost effective in that extensive testing is required to implement such a system.

As will be discussed, the present invention, which is amenable to both large and small pipeline distribution networks, utilizes fuzzy logic control to control production to closely match demand of the customers and thereby to minimize the need to either vent gaseous product or vaporize liquid product.

SUMMARY OF THE INVENTION

The present invention provides a method of controlling production of a gaseous product produced by at least one production plant having a control system to vary production of the gaseous product. In this regard, the term "production plant" encompasses any type of plant that produces a gaseous product. One common example is a cryogenic air separation plant. Another example is a hydrogen plant in which hydrogen is produced by the steam methane reforming of natural gas. Gaseous product is consumed by at least one customer at a varying rate. There is a storage capacity for the gaseous product interposed between the production plant and the customer.

In accordance with the method, usage values of a variable are measured. The usage values are at least referable to the usage of the at least one customer of the gaseous product during a sampling time interval. An average rate of change of usage of the at least one customer is calculated from the usage values over a time interval greater than that of the sampling time interval. At least one pressure is measured within the storage capacity to produce a current pressure value. The current pressure value and the average rate of change of usage of the at least one customer is inputted as data into a fuzzy logic controller programmed with a fuzzy logic program to determine a change in production of the gaseous product produced by the production plant such that the pressure within the storage capacity is within a predetermined pressure range.

The fuzzy logic program functions by converting the data referable to the current pressure value and the average rate of change of usage into initial linguistic values which are based upon the predetermined pressure range and the production capacity of the production plant. The initial linguistic values are applied to at least one rule set to produce a final linguistic value for the change and production of the gaseous product. The final linguistic value is converted into control data referable to a change in production. The fuzzy logic program is executed over a calculation time interval and the control data is inputted to the control system over each of the calculation time intervals to effect a change in production of the gaseous product.

Thus, the present invention is applicable to one or more production plants that supply gaseous product to one or more customers. Fuzzy logic program captures both the pressure within the storage capacity and therefore, customer usage as a trend, to allow for the continual resetting of production levels. As such, it is amenable to application for both small and large distribution systems. Additionally, the type of fine tuning that would be required in prior art automated systems is not required since the logic functions on the basis of human-like decisions. Hence, the present invention can be applied to control the production of gaseous product in a more cost effective manner than the prior art.

The at least one customer can be a plurality of customers. In such case, the average rate of change of usage is calculated with respect to the customer that consumes most of the gaseous product.

Alternatively, the average rate of change of usage can be calculated from a weight of average of change of all the plurality of customers.

The value that is referable to customer usage can be pressure within the storage capacity. In such case, the rate of change of pressure serves as an input to the fuzzy logic controller along with the current value of pressure.

Advantageously current production data that is referable to production of the gaseous product by one or more production plants can be inputted into the fuzzy logic controller. The at least one rule set consists of an initial rule set and a final rule set. The current production data is then converted into the further linguistic values which are based upon the production capacity of the production plant. The initial linguistic values related to the current pressure value and the average rate of change of usage are applied to the initial rule set to produce intermediate linguistic values. The intermediate linguistic values and the initial linguistic values related to current production data are applied to the final rule set to obtain the final linguistic values. The advantage of this method is that the bounds checking can be entirely within the control program since the initial linguistic values related to the production data are based on the production of the air separation plant itself and are therefore bounded.

The storage capacity can be a gas receiver. Another possibility is that the storage capacity is the pipeline itself.

Where liquid is vaporized to produce additional gaseous product when customer demand exceeds a maximum amount of production of the gaseous product by the production plant, during vaporization of the liquid, the execution of the fuzzy logic program can be temporarily and partially suspended. During such suspension, the intermediate set of linguistic values are not applied to the rule set and the final linguistic value is set such that the control data will be referable to a maximum increase in the change of production. The purpose here is to minimize the time that liquid is vaporized. Alternatively, when gaseous product is vented from the storage capacity, that is when pressure within the storage capacity exceeds a maximum allowable value, again the execution of the fuzzy logic program can be partially suspended. During such partial suspension, the intermediate set of linguistic values are not applied to the rule set and the final linguistic value is set such that the control data will be referable to a maximum decrease in the change of production.

Actual customer usage can also be taken into account by the fuzzy logic controller. Where pressure is measured, the actual usage of the at least one customer of the gaseous product can also be measured during the sampling time interval. The actual usage data referable to the actual usage of the at least one customer is inputted into the fuzzy logic controller. Within the fuzzy logic controller an actual usage average rate of change of the actual usage over the time interval is calculated and the data referable to said actual usage average rate of change is converted to further initial linguistic values representative thereof. The at least one rule set in such case is an initial rule set and a final rule set. The initial linguistic values corresponding to the actual usage average rate of change and the average rate of change of usage are applied to the initial rule set to obtain intermediate linguistic values. The intermediate linguistic values and a particular one of the initial linguistic values corresponding to the current pressure value are applied to the final rule set to produce the final linguistic value. With the added information, changes in production can be produced that more closely match customer usage since customer usage is a variable that is considered in the program.

Preferably, the intermediate linguistic values and the final linguistic values are triangular fuzzy sets. The final linguistic values converted into control data by a center of gravity technique.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

DETAILED DESCRIPTION

Figure 1:
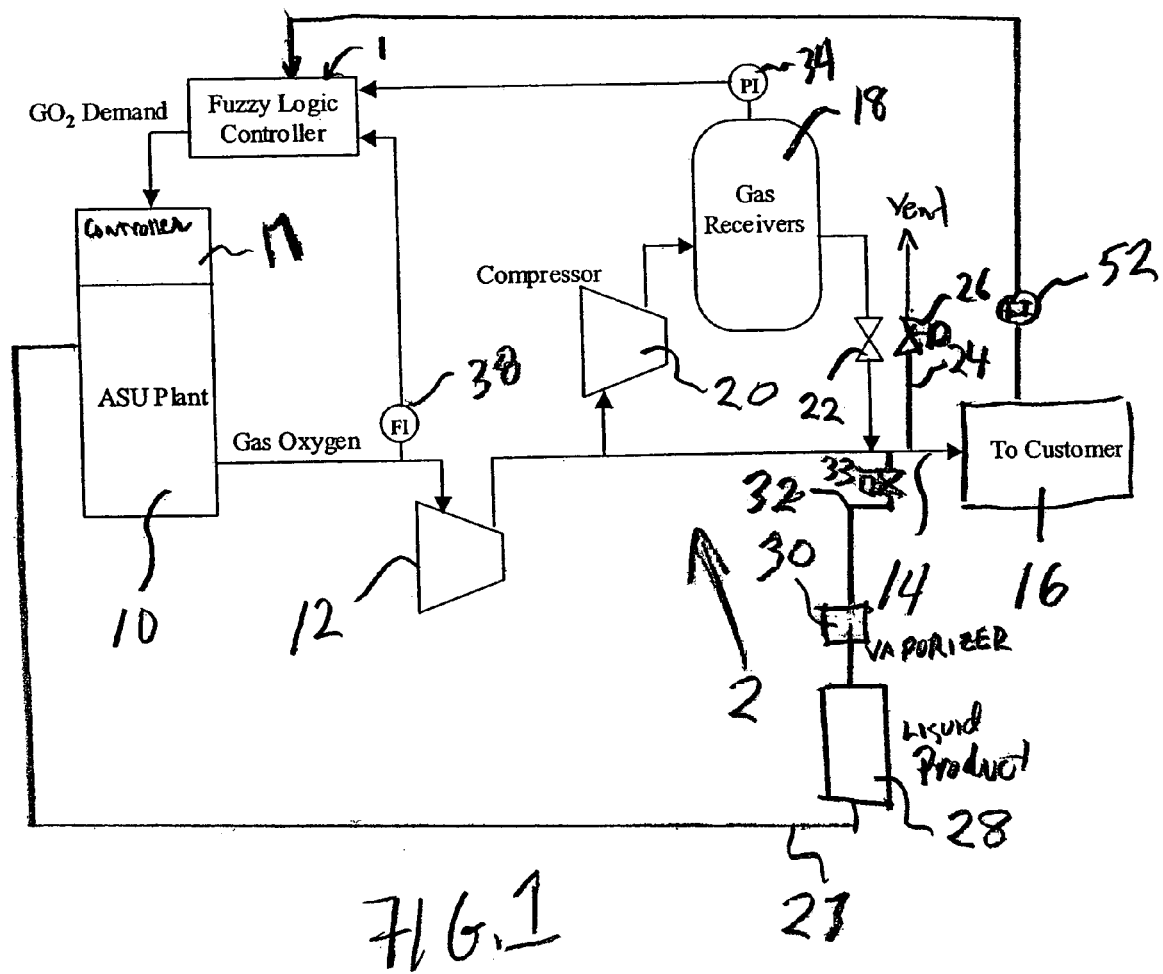
FIG. 1 is a schematic illustration of a supply network to supply customer having a variable demand and that controlled in a manner in accordance with the present invention.

With reference to FIG. 1, a controller 1 programmed in accordance with the present invention is shown in connection with a gas distribution system 2. For the sake of simplicity of explanation, gas distribution system 2 consists of an air separation plant 10 that produces gaseous oxygen that is compressed by a compressor 12 and sent by a pipeline 14 to a single customer 16. As will be discussed, the present invention contemplates the use of multiple plants 10 and multiple customers 16.

Air separation plant 10 is a cryogenic distillation plant of any known design that is configured to produce at least a gaseous oxygen product. Typically, such a plant is a double column arrangement in which gaseous nitrogen products are also produced. Air separation plant 10 is controlled by an electronic controller 17, also of any one of a number of well known designs that is capable of controlling air separation plant 10 to produce the gaseous oxygen product at a specific rate through appropriate electronic control by controller 1.

The product gaseous oxygen is only exemplary. For instance, the present invention will have equal applicability to a hydrogen production plant in which a hydrocarbon feed stream, for instance, natural gas converted to a hydrogen and carbon monoxide containing synthesis gas which was further processed to produce a gaseous hydrogen product.

Customer 16 consumes the gaseous oxygen product at a variable consumption rate. In gaseous supply contracts, the pressure within pipeline 14 is maintained in a predetermined range by virtue of contract with the gas supplier. In order to maintain such pressure and to meet customer demands, the pipeline 14 itself may be sufficiently voluminous to provide a storage capacity to meet fluctuating demands and therefore fluctuating pressure. Alternatively, as illustrated, a gas receiver 18, or a plurality of the same, is provided that is supplied with gaseous oxygen at pressure for the use of a compressor 20. When pressure falls to a sufficiently low level, a valve 22 opens to supply additional gaseous oxygen product. If customer 16 rapidly reduces its demand for gaseous oxygen product, the pressure within pipeline 14 may rise to a sufficiently high level that safety may be compromised. In such circumstances, excess gaseous product will be vented by way of a vent line 24 upon the opening of a vent valve 26.

It is also possible that customer 16 is sufficiently rapidly increases its requirements for gaseous oxygen that additional oxygen supplied by gas receiver 18 is insufficient to maintain the contract pressure within pipeline 14 and the demand of customer 16. In such case, a liquid oxygen stream 27 is introduced into a storage tank 28. The liquid oxygen stream 27 may come from the air separation plant 10 as shown or from an external source such as a truck shipment. In order to meet the demand, the liquid oxygen is vaporized within a vaporizer 30 and introduced as a supplementary gaseous oxygen stream 32 into pipeline 14 by opening a valve 33.

Figure 2:
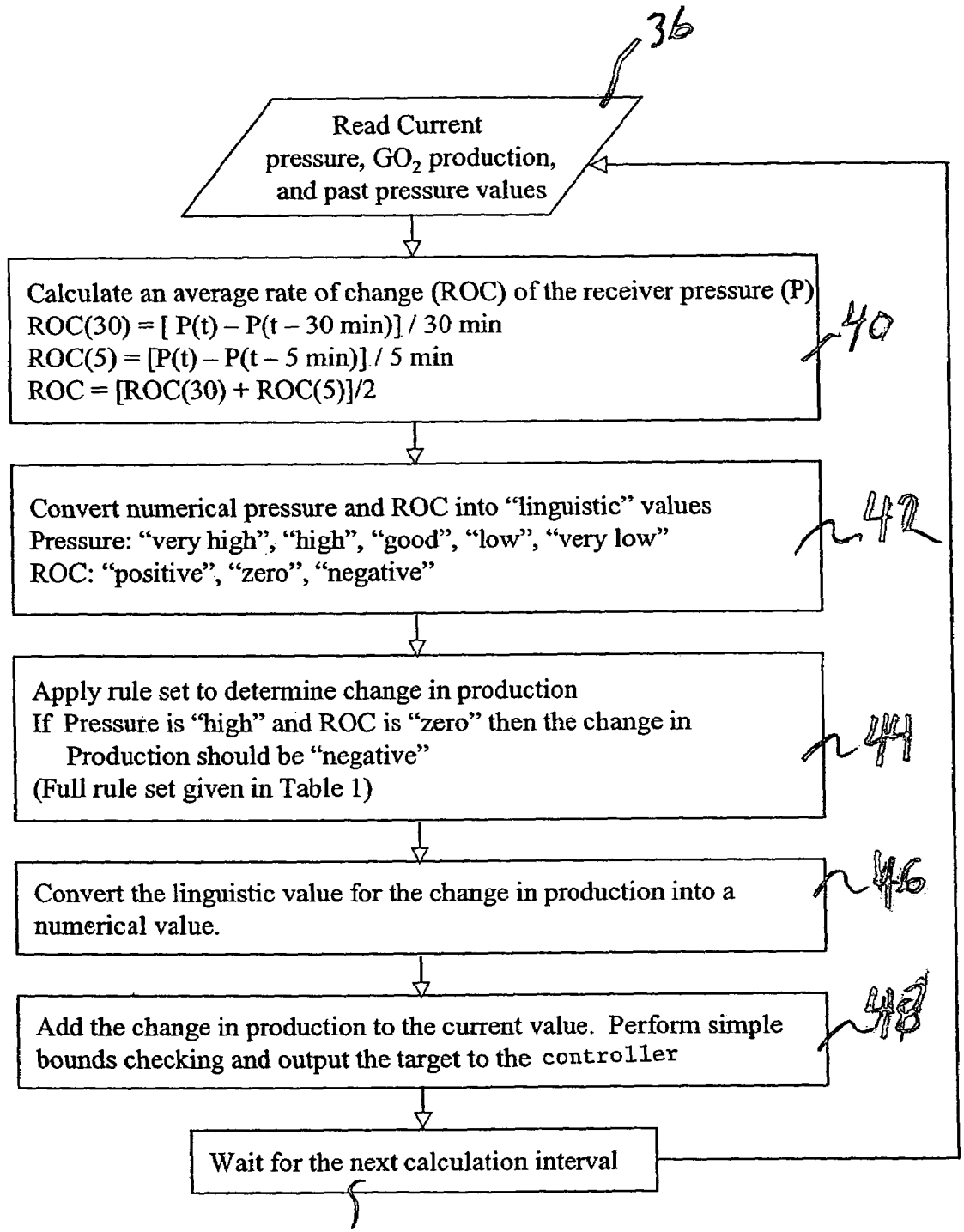
FIG. 2 is a flow chart of the calculations of the fuzzy logic controller.

As may be appreciated, since oxygen represents roughly 20 percent of the volume of air, it is more expensive than nitrogen. Liquid oxygen is a particularly valuable product given that additional energy that must be expended to liquefy the oxygen. It is therefore readily apparent that the degree to which gaseous oxygen is vented or liquid oxygen is vaporized should be minimized by proper control of air separation plant 10 so that the production of gaseous oxygen closely matches demand for the gaseous oxygen by customer 16. This is done in the present invention by way of an automated control provided by controller 1. Controller 1 utilizes a fuzzy logic program, for instance the Fuzzy Logic Toolbox for MATLAB that can be obtained from The MathWorks, Inc. (3 Apple Hill Drive, Natick, Mass. 01760-2098). With reference to FIG. 2, the fuzzy logic program functions, at minimum, by measuring and reading a pressure in a storage capacity, which in the example is gas receiver 18. The storage capacity could also be in addition or in the alternative, a pipeline used in supplying the customer. The pressure is measured by a pressure transducer 34 and read by introducing the output of the pressure transducer 34 into an analog input of fuzzy logic controller 1. The analog input is converted into data and stored as a current pressure value within fuzzy logic controller 1. In addition, a usage value is also measured that is at least referable to the usage of the customer 16 of the oxygen product during a sampling time interval. This variable can be an exact measure of customer usage. In the illustration, an approximate value of customer usage is measured which is the pressure measured by pressure transducer 34 within gas receiver 18. Previous values and current values of pressure may be stored either outside of or within controller 1 in a known manner.

Thus, during a calculation time interval that is greater than the sampling time interval, the current pressure within receiver 18 and past pressure values are read at 36. In addition, the current flow rate of the gaseous oxygen produced by air separation plant 10 may be measured by flow indicator 38 and similarly stored externally or within fuzzy logic controller 1 as a measure of current gaseous oxygen production.

An average rate of change of usage of customer 16 is then calculated for a time period greater than that of the sampling time interval. In this case, as indicated at 40, rate of changes are calculated both at 30 and at 5 minutes and then averaged to produce a mean equal to the rate of change. In step 42, the numerical current pressure of receiver 18 and the rate of change are converted to initial linguistic values. The initial linguistic values are based upon a predetermined pressure range to which the gaseous product is to be delivered to customer 18 and production capacity of the air separation plant 10. In step 44, the initial linguistic values are applied to a rule set to determine final linguistic values. Rules contained in the rule set are derived from knowledge of the system operation, experience and common sense. The final linguistic values are in turn converted or defuzzified into a numerical value at 46. The numerical value representing the change in production is then added to the current value read by flow indicator 38 at step 36. The results are then inputted as control data into a controller 17 that is associated with air separation plant 10 for its control. As may be appreciated, the control data fed to controller 17 may be simply the change in production with any addition to the current value of production being added within controller 17 itself. At the succeeding calculation time interval, as indicated at 50, the same calculations are performed and control data becomes available to controller 17 that is updated as necessary.

Figure 3:
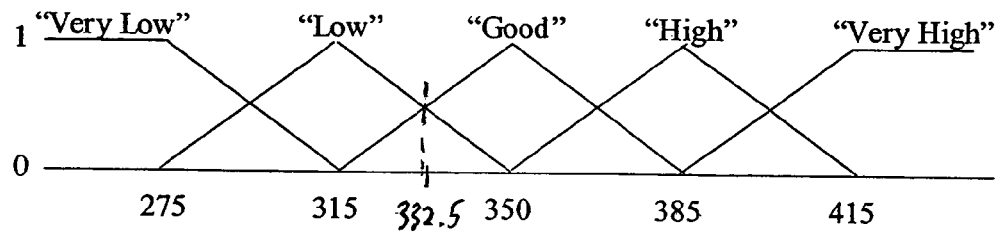
FIG. 3 is a graphical representation of a fuzzy set that is used to convert receiver pressure into fuzzy variables.

As an example of the foregoing, assuming that the pressure within gas receiver 18, as measured by pressure transducer 34, is 332.5, psig, with reference to FIG. 3, the initial linguistic values would be 50% "low" and 50% "good".

FIG. 3 assumes that the optimal pressure for gas receiver 18 is 350 psig. The range of pressure is between 275 psig, where gaseous oxygen has to be added through vaporization of liquid and 415 psig where gaseous oxygen needs to be vented by opening valve 26. Thus, in this example, the predetermined pressure range of control for controller 1 is between 275 psig and 415 psig. The points at which the triangular areas go to zero are based on operating experience. For instance, if the desired pressure of receiver 18 is 350 psig, then somewhere between 275 psig and 350 psig, the receiver pressure is seen to be low and the production of gaseous oxygen needs to be increased. The design of the set is based on sound engineering judgement, that as the pressure increases from 315 to 350 the pressure can characterized less as "low" and more as being "good".

Figure 4:
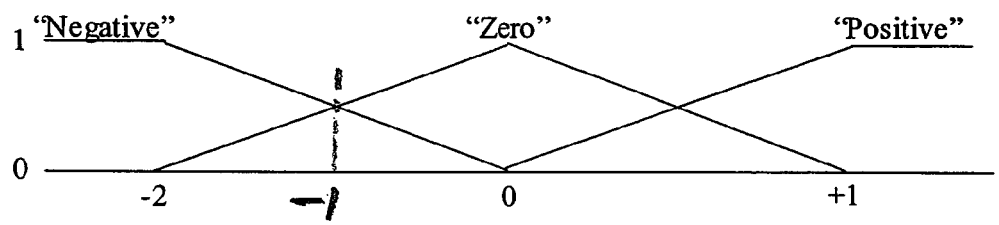
FIG. 4 is a graphical representation of a fuzzy set that is used to convert rate of change of receiver pressure into fuzzy variables.

The rate of change of receiver pressure is also converted into initial linguistic values. Assuming for exemplary purposes, a rate of change of pressure of −1 psi/min, the associated initial linguistic values, as determined from FIG. 4, are 0.5 negative and 0.5 zero. This figure is also based on plant experience. For instance, the more the rate of change is closer to a decrease of 2 psi/min, then the greater the rate the receiver pressure is dropping and the more likely, the change in receiver pressure will be characterized as "negative". These initial linguistic values are the applied to a rule set indicated in tabular form in Table 1 below. The table is based on common operating procedure for the particular plant and again good engineering judgment of the ability of the system illustrated in FIG. 1 to react to the various changes included in the table. For instance, where the pressure is good and the rate of change is zero, then the change in gaseous oxygen production is also zero.

TABLE 1

| Rule | If Pressure is | If ROC of Pressure is | Then change in $GO_2$ should be |
|---|---|---|---|
| 1 | "Very High" | "Positive" | "Very Negative" |
| 2 | "Very High" | "Zero" | "Very Negative" |
| 3 | "Very High" | "Negative" | "Negative" |
| 4 | "High" | "Positive" | "Very Negative" |
| 5 | "High" | "Zero" | "Negative" |
| 6 | "High" | "Negative" | "Zero" |
| 7 | "Good" | "Positive" | "Negative" |
| 8 | "Good" | "Zero" | "Zero" |
| 9 | "Good" | "Negative" | "Positive" |
| 10 | "Low" | "Positive" | "Zero" |
| 11 | "Low" | "Zero" | "Positive" |
| 12 | "Low" | "Negative" | "Very Positive" |
| 13 | "Very Low" | "Positive" | "Positive" |
| 14 | "Very Low" | "Zero" | "Very Positive" |
| 15 | "Very Low" | "Negative" | "Very Positive" |

Applying the initial linguistic values to the rules in Table 1 produces final linguistic values. In the instant example there are four possible combination of variables and therefore, four applicable rules sets, namely, 8, 9, 11, and 12. For example, rule #11 states that if the pressure is low and the rate of change of pressure is zero, then the change in gaseous oxygen production should be positive. That task is accomplished by taking the intersection of the two intermediate sets of fuzzy variables, "pressure is low" and "change is pressure is zero", that make up the rule. The intersection of the variables is calculated as a minimum of their respective memberships which in this case is 0.5. Similarly, rule 12 is calculated as 0.5, rule 8 as 0.5, and rule 9 as 0.5. The values are normalized to 1.0 to make the calculations easier. Therefore the result is rules 8, 9, 11, 12 are all ¼ applicable and all the other rules do not apply.

The rule set is applied to convert those degrees of applicability of each rule into a characterization of the output of the final linguistic values. Rule 8 states that the change is $GO_2$ production should be "zero", rules 9 and 11 say "positive", and rule 12 says "very positive". The total characterization of the output is simply the sum of the applicability of the rules which dictate a given controller action. The result is the change in $GO_2$ production can be characterized as (0.25, "zero"), (0.5, "positive") and (0.25, "very positive").

Figure 5:
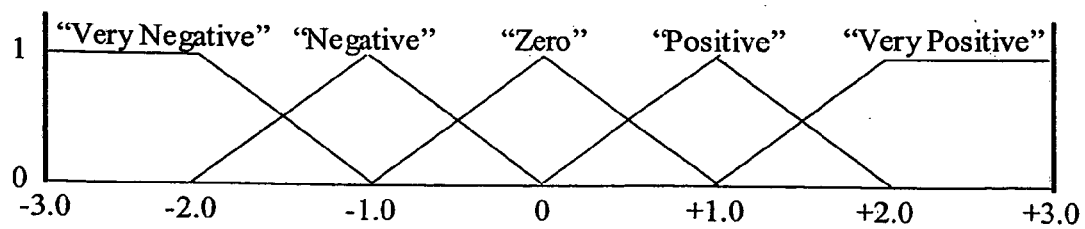
FIG. 5 is a graphical representation that is used to convert the set of fuzzy variables from rule set into changes in gaseous production.

After the controller output has been described in linguistic terms, the final linguistic values are converted back to a numerical value. This is referred to as defuzzifing the output. In such conversion, fuzzy sets, such as shown in FIG. 5, are used to convert or defuzzify the output. As illustrated, the fuzzy sets are triangular, but as well known in the art, other geometries are possible. This chart is derived from the response capability of the plant. For instance a purely "negative" value for the particular plant would mean the plant would have to decrease gaseous oxygen production at −1 mcfh/min. (one thousand standard cubic feet per hour per min) The plant operation is bounded by a decrease of −3 and an increase of +3. The output of such a fuzzy set is then converted to a numerical value using the common and simple center of gravity approach. In such approach, the center of gravity of each of the membership sets is determined. The numerical value of the output is then the sum of the centers of gravity multiplied by the membership of each set. In the example above, the centers of gravity are 0 for "zero", 1.0 for "positive", and 2.25 for "very positive". The weighted sum of the centers of gravity is calculated as: (0.25)(0)+(0.5)(1.0)+(0.25)(2.25)=1.0625. Therefore the numerical value for the change in $GO_2$ production is +1.0625 MCFH/min.

The final step in the process is to add the change in production multiplied by the calculation interval to current gaseous oxygen production to determine the new target value. Since there are limits on the gaseous oxygen production from the plant it is necessary to perform a simple bounds check on the production target before it is sent to the control system. If the calculated production is greater than the maximum, or less than the minimum, the respective maximum or minimum is outputted to the control system. If the calculated value is between the minimum and maximum, such value is relayed from controller 1 to controller 17 unchanged.

The procedures describe above are then repeated at the next calculation interval which can be 1 min. It is possible this the calculation interval might need to be changed depending upon the implementation.

There are other possible features that could be added to the control scheme mentioned above. For instance, the vaporization of liquid might be integrated by having the control program monitor such vaporization. This can be an actual of flow measurement or a valve position of for example, valve 33. In the programming, a variable "on" could be defined as either a flow greater than zero or an open flow valve. A variable "off" would be defined as the opposite, for instance, zero flow, or a closed flow valve. If "on" were encountered, execution of the program would be suspended to the extent that an overriding rule would be applied. The overriding rule would be to set the change in gaseous oxygen production as "very positive". If "off" were encountered, the rule set would be applied in the manner outlined above and the program would continue to execute.

The application of vent flow is similar to the liquid vaporization given above. The programming would entail the monitoring of an indication of vent flow, for example either actual flow or a valve position of valve 26. A variable "open" could be defined to determine the "state" of the vent in which the flow of the gaseous oxygen were greater than zero, or an open flow valve. A variable "closed" would be defined in an opposite manner, for example, zero flow or a closed valve 26. In the rule set, an overriding rule would apply which could be, If vent is "open" then the change in $GO_2$ production is "very negative". If the variable is "closed" execution of the program is continued and the rule set is applied in the manner outlined above.

Figure 6:
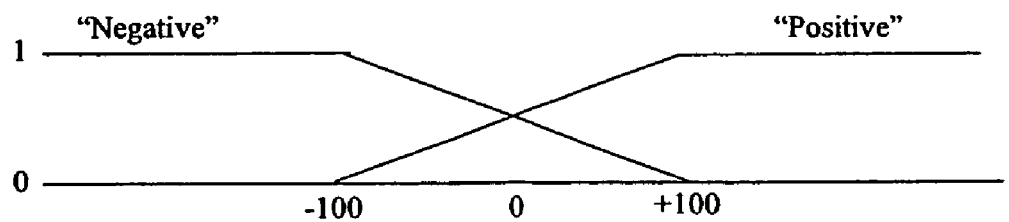
FIG. 6 is a graphical representation of a fuzzy set that is used to convert rate of change of customer usage into fuzzy variables.

The programming can also be modified to be responsive to changes in customer flow. In accordance with such change, the current and past values of the customer flow are read into the controller from a flow indicator 52. From such values, a rate of change of the customer flow could be computed in the same manner as a rate of change in the receiver pressure is calculated in step 40 of FIG. 2. The numerical value for the change in customer flow is then converted to initial linguistic values by the use of a fuzzy set definition. An example of a fuzzy set definition applicable to the rate of change of customer flow is set forth in FIG. 6. This chart is derived through examination of a demand pattern of a customer. For instance, a change in customer flow rate or demand in other words, of −100 mcfh/min is a significant "negative" change" requiring an increase in production with due regard to the measured receiver pressure.

An initial rule set is provided to take into account the initial linguistic values of rate of change customer flow and rate of change in pressure of gas receiver 18 and thereby produce intermediate linguistic values. In accordance with such modification, intermediate linguistic values ("M" for measured value) are defined by a rule set forth in tabular form in Table 2. In Table 2, "dP" is the change in receiver pressure, "dC" is the change in the customer flow, P is "Positive", Z is "Zero", and N is "Negative". For instance, where dP and dC are both positive, M is zero.

TABLE 2

|    | dC  |     |
|----|-----|-----|
| dP | P   | N   |
| P  | Z   | P   |
| Z  | N   | P   |
| N  | N   | Z   |

The values of M determined from Table 2 are then applied with the pressure measured in gas receiver 18 by pressure transducer 34 to a final rule set shown forth in Table 3 below to obtain final linguistic values. In the table, "P" is pressure in the gas receiver 18, "VP" is very positive, "VN" is very negative, "VH" is very high, "H" is high, "G" is good, "L" is low, and "VL" is very low.

TABLE 3

|    |    | M  |    |
|----|----|----|----|
| P  | P  | Z  | N  |
| VH | VN | VN | N  |
| H  | VN | N  | Z  |
| G  | N  | Z  | P  |
| L  | Z  | P  | VP |
| VL | P  | VP | VP |

The rest of the controller remains the same in that the results of Table 3 would be applied to FIG. 5 to defuzzify or convert the final linguistic values to a numerical value using the center of gravity approach and a new target of oxygen production in the manner set forth above where only the rate of change of pressure and pressure were considered with respect to Table 1. The rule sets given above are again based on experience and sound engineering judgement of the reaction of the system illustrated in FIG. 1 to react to the various changes included in the table.

Multiple pressure measurements for different points in the pipeline can also be included in the controller. In order to effectuate such adaptation, a controlling pressure for the system is defined (which would be the "P" in the above rule set). There are several possibilities. For instance, one of the pressures could explicitly control without regard to the values of the other pressures. Alternatively, a weighted average of all the pressures could be used. Another possibility is to utilize the minimum or maximum of the pressures. The rate of change of the pressure could be determined in several different ways. In each case, however, an average rate of change would be calculated for each of the pressure measurements. The total rate of change in the pressure ("dP") could be calculated as the weighted average of all rates of change or the maximum absolute rate of change. Once the numerical values are determined, the rest of the controller can be executed as outlined above.

Multiple Customer Measurements can also be included. The same concept that is used in multiple pressure measurement can be applied to multiple customer measurements. The total rate of change of the "customers" could be calculated as the change of only the largest customer or the weighted average of all changes or the maximum absolute change. Once the change in customer flow is calculated, the controller calculations would proceed as set forth above.

Figure 7:
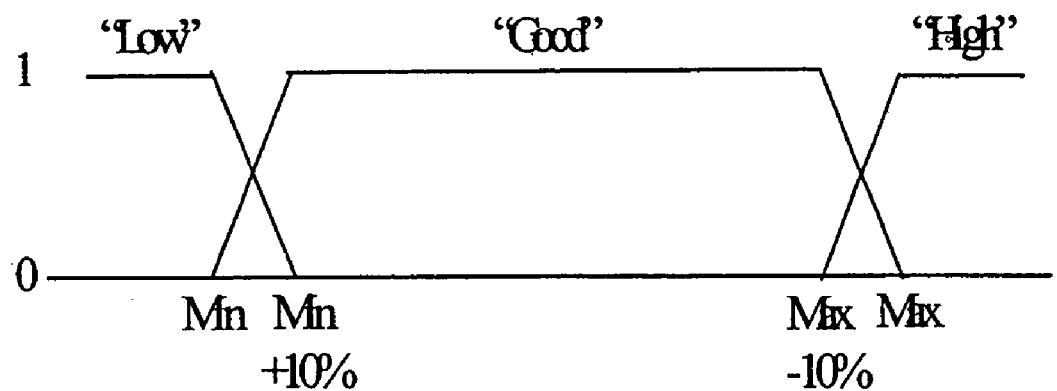
FIG. 7 is a graphical representation of a fuzzy set that is used to convert rate of change of current plant production into fuzzy variables.

It is also possible to include the current production as a controller input. Such value can be used to slow the controller response down when the plant is nearing a limit. This is accomplished by limiting the rate of production change near the production limits. In effectuating the foregoing adaptation, after measuring and reading the current production from flow indicator 38 as an input to controller 1, the current production would be converted from a numerical value to a further intial linguistic value. An example of a suitable fuzzy set is shown in FIG. 7. FIG. 7 is derived for the particular plant. The "min" and "max" are minimum and maximum plant production in terms of gaseous oxygen in mcfh (one thousand standard cubic feed per hour). The outer minimum and maximum represents the operational range of the plant. Since this is an example of a set and there are a variety of air separation plants, no exact units where shown. The "min" plus 10% is the point at which the requested rate of change should be decreased. Ten percent was chosen on the basis of experience as to the operation of the plant and its control system and the capability of the same to assume a stable output on the basis of a requested change in the plant output. Thus, between "min"+10% and "max"−10% the current plant production is "good" and the rate of change that has been calculated can be directly implemented without change.

An additional or final rule set is provided to calculate a limited change in production based on the results of the rule set shown in Table 1 and the fuzzy input related to current production given above. Hence, Table 1 is the initial rule set and produces intermediate linguistic values related to the average rate of change of customer usage and current pressure. The final rule set is given in tabular form in Table 4, below. The notation in Table 4 is the same as in the previous tables, with the addition of "dF" as the change in gaseous oxygen flow (calculated from the rules in Table 1) and "F", the current production:

|    |    | F  |    |
|----|----|----|----|
| dF | L  | G  | H  |
| VP | VP | VP | Z  |
| P  | P  | P  | Z  |
| Z  | Z  | Z  | Z  |
| N  | Z  | N  | N  |
| VN | Z  | VN | VN |

In step 44, the change in production calculated from the above rule set would be converted back to a numerical value. Step 48 could be eliminated since no bounds checking would be required.

As can be appreciated by those skilled in the art, the fuzzy sets used above are simply exemplary only. Both the shape and the manner of derivation could me more or even less complex than that considered in the examples.

While the present invention has been described with reference to preferred embodiments, as will occur to those skilled in the art, numerous changes, additions and omissions may be made without departing from the spirit and scope of the present invention.

What is claimed is:

1. A method of controlling production of a gaseous product produced by at least one production plant having a control system to vary production of said gaseous product, the gaseous product being consumed by at least one customer at a varying rate and there being a storage capacity for the gaseous product interposed between the production plant and the customer, said method comprising:

measuring usage values of a variable that is at least referable to the usage of the at least one customer of the gaseous product during a sampling time interval;

calculating an average rate of change of usage of the at least one customer from the usage values over a time interval greater than that of the sampling time interval;

measuring at least one pressure within the storage capacity to produce a current pressure value;

inputting the current pressure value and the average rate of change of usage of the at least one customer as data into a fuzzy logic controller programmed with a fuzzy logic program to determine a change in production of the gaseous product produced by the production plant such that the pressure within the storage capacity is within a predetermined pressure range by converting data referable to the current pressure value and the average rate of change of usage into initial linguistic values which are based upon the predetermined pressure range and production capacity of the production plant, applying the initial linguistic values to at least one rule set to produce final linguistic values for the change in production of the gaseous product, and converting the final linguistic values into control data referable to the change in production;

executing the fuzzy logic program over a calculation time interval; and inputting the control data to the control system over each said calculation time interval to effect the change in production of the gaseous product.

2. The method of claim 1, wherein the at least one customer is a plurality of customers and the average rate of change of usage is calculated with respect to the customer that consumes most of the gaseous product.

3. The method of claim 1, wherein the at least one customer is a plurality of customers and the average rate of change of usage is calculated from a weighted average of change of all of the plurality of customers.

4. The method of claim 1, wherein the value is the at least one pressure within the storage capacity.

5. The method of claim 4, further comprising:

measuring an actual usage of the at least one customer of the gaseous product during a sampling time interval and inputting actual usage data referable to the actual usage of the at least one customer into the fuzzy logic controller;

calculating within the fuzzy logic controller an actual usage average rate of change of the actual usage over the time interval and converting the data referable to said actual usage average rate of change to the initial linguistic values representative thereof;

the at least one rule set being an initial rule set and a final rule set;

applying the initial linguistic values corresponding to the actual usage average rate of change and the average rate of change of usage to the initial rule set to obtain intermediate linguistic values; and applying the intermediate linguistic values and a particular one of the initial linguistic values corresponding to the current pressure value into the final rule set to produce the final linguistic value.

6. The method of claim 1, further comprising:

the at least one rule set consisting of an initial rule set and a final rule set;

inputting current production data referable to current production of the gaseous product by the at least one production plant into the fuzzy logic controller;

converting the current production data into further initial linguistic values that are based upon the production capacity of the production plant;

applying the initial linguistic values related to the current pressure value and the average rate of change of usage to an initial rule set to produce intermediate linguistic values; and applying the intermediate linguistic values and the further linguistic values to the final rule to obtain the final linguistic values.

7. The method of claim 1, wherein the storage capacity is a gas receiver.

8. The method of claim 1, further comprising:

vaporizing liquid to produce additional gaseous product when customer demand exceeds a maximum amount of the production of the gaseous product by the production plant; and during vaporization of the liquid, partially suspending the execution of the fuzzy logic program so that the intermediate set of linguistic values are not applied to the rule set and the final linguistic value is set such that the control data will be referable to a maximum increase in the change of production.

9. The method of claim 1, further comprising:

venting the gaseous product from the storage capacity when the pressure within the storage capacity exceeds a maximum allowable value; and during venting of the gaseous product, partially suspending the execution of the fuzzy logic program so that the intermediate set of linguistic values are not applied to the rule set and the final linguistic value is set such that the control data will be referable to a maximum decrease in the change of production.

10. The method of claim 1, wherein:

the intermediate linguistic values and the final linguistic value are triangular fuzzy sets; and the final linguistic value is converted into control data by center of gravity techniques.

* * * * *